United States Patent [19]
Allen et al.

[11] Patent Number: 5,745,698
[45] Date of Patent: Apr. 28, 1998

[54] SYSTEM AND METHOD FOR COMMUNICATING BETWEEN DEVICES

[75] Inventors: Michael Scott Allen, Austin; Ravi Kumar Arimilli, Round Rock; John Michael Kaiser, Cedar Park; William Kurt Lewchuk, Austin, all of Tex.

[73] Assignees: International Business Machines Corporation, Armonk, N.Y.; Motorola, Inc., Schaumburg, Ill.

[21] Appl. No.: 704,035

[22] Filed: Aug. 28, 1996

Related U.S. Application Data

[63] Continuation of Ser. No. 298,873, Aug. 31, 1994, abandoned.

[51] Int. Cl.$^6$ .............................. G06F 15/16; G06F 13/00
[52] U.S. Cl. ....................... 395/200.67; 395/285; 395/290
[58] Field of Search ......................... 395/200.6–200.67, 395/285, 290, 839; 379/93.32

[56] References Cited

U.S. PATENT DOCUMENTS

| | | | |
|---|---|---|---|
| 3,603,932 | 9/1971 | Kerr et al. | 340/825.17 |
| 4,218,739 | 8/1980 | Negi et al. | 395/735 |
| 4,412,285 | 10/1983 | Neches et al. | 395/650 |
| 4,785,394 | 11/1988 | Fischer | 364/200 |
| 5,191,649 | 3/1993 | Cadambi et al. | 395/200 |
| 5,195,089 | 3/1993 | Sindhu et al. | 370/85.1 |
| 5,202,973 | 4/1993 | Ramanujan et al. | 395/425 |
| 5,208,914 | 5/1993 | Wilson et al. | 395/275 |
| 5,261,109 | 11/1993 | Cadambi et al. | 395/725 |
| 5,367,695 | 11/1994 | Narad et al. | 395/800 |
| 5,416,510 | 5/1995 | Moyer et al. | 395/293 |
| 5,418,914 | 5/1995 | Heil et al. | 395/293 |
| 5,430,849 | 7/1995 | Banks | 395/308 |
| 5,459,459 | 10/1995 | Lee, Jr. | 340/870.02 |
| 5,463,753 | 10/1995 | Fry et al. | 395/473 |

OTHER PUBLICATIONS

*IBM Technical Disclosures Bulletin*, vol. 30, No. 9, Feb. 1988, pp. 286–289, "Single Instruction Mode for Pipelined Processor".

*Primary Examiner*—Jack B. Harvey
*Assistant Examiner*—Paul R. Myers
*Attorney, Agent, or Firm*—Michael A. Davis, Jr.

[57] ABSTRACT

A method and system are provided for communicating between devices. A signal is output from a first device. In response to the signal, at least one action is initiated by a second device. An indication is output of whether the second device completed the action and of whether operation of the second device is independent of the first device reoutputting the signal.

42 Claims, 5 Drawing Sheets

SYSTEM AND METHOD FOR COMMUNICATING BETWEEN DEVICES

This is a continuation of application Ser. No. 08/298,873 filed Aug. 31, 1994 now abandoned.

DESCRIPTION

1. Technical Field

This patent application relates in general to information processing systems and in particular to a method and system for communicating between devices.

2. Background of the Invention

In an information processing system, devices are able to communicate information between one another. By outputting an operation signal, a device is able to initiate a bus operation on a system bus that is snooped by other bus devices. Through the system bus, each snooping bus device (i.e. each device that snoops the operation signal) outputs a snoop response indication to the master bus device (i.e. the device which initiated the bus operation) some predetermined or variable latency from initiation of the bus operation on the system bus.

Snoop response indications occur in response to respective bus operations. In a strongly ordered system, such snoop response indications occur in the same order as their respective bus operations, such that bus operations and snoop response indications are strongly ordered relative to one another. Nevertheless, a shortcoming of some previous strongly ordered systems is that completion of subsequent bus operations is delayed while waiting for completion of all preceding bus operations. Completion is delayed even if the subsequent bus operations are otherwise able to complete.

Some previous techniques have attempted to alleviate this shortcoming by supporting an address "Retry" snoop response indication. In response to such an address "Retry" snoop response indication, subsequent bus operations are able to complete. By later reoutputting the operation signal, the master bus device reinitiates the "retried" bus operation on the system bus.

However, a shortcoming of such a "Retry" technique is that the reinitiated bus operation (repeated in response to an earlier "Retry" snoop response indication) is again snooped and fully acted upon (as for example by reading status bits in the snooping device's cache memory) by every snooping bus device. Another shortcoming is that deadlocks can be introduced when only a "Retry" technique is used.

For example, a "ping-pong" deadlock could occur if a first snooping device completes its action in response to the bus operation, yet a second snooping device fails to complete its action in response to the bus operation and accordingly outputs an address "Retry" snoop response indication. Later, the master bus device reinitiates the "retried" bus operation on the system bus. Since the reinitiated bus operation is again snooped and fully acted upon by every snooping bus device, it is possible that the second snooping device can complete its action in response to the reinitiated bus operation, yet the first snooping device fails to complete its action in response to the reinitiated bus operation and accordingly outputs an address "Retry" snoop response indication. This sequence of events can repeat indefinitely, with the first and second device alternately taking turns outputting an address "Retry" snoop response indication.

As another example, a deadlock could occur if future operations of the snooping bus device are dependent on the master bus device later repeating the "Retried" bus operation, yet for some reason the master bus device fails to repeat the "Retried" bus operation. Alternatively, if the master bus device were required to always repeat the "Retried" bus operation, the master bus device would lose valuable flexibility by failing to have the option of not repeating the "Retried" bus operation.

Thus, a need exists for a method and system for communicating between devices, in which completion of subsequent bus operations is not delayed while waiting for completion of all preceding bus operations. Also, a need exists for a method and system for communicating between devices, in which not every snooping bus device is required to snoop and fully act upon a repeated bus operation. Further, a need exists for a method and system for communicating between devices, in which deadlocks are less likely to occur. Moreover, a need exists for a method and system for communicating between devices, in which a master bus device retains flexibility by having the option of not repeating a bus operation.

SUMMARY OF THE INVENTION

In a first aspect of a method and system for communicating between devices, a signal is output from a first device. In response to the signal, at least one action is initiated by a second device. An indication is output of whether the second device completed the action and of whether operation of the second device is independent of the first device reoutputting the signal.

In a second aspect of a method and system for communicating between devices, a signal is output from a first device. In response to the signal, at least one action is initiated by second and third devices. An indication is output of whether the second and third devices completed the action. Without reinitiating the action by the third device, the signal is reoutput from the first device in response to the indication indicating that the second device failed to complete the action and that the third device completed the action.

It is a technical advantage of the present inventions that completion of subsequent bus operations is not delayed while waiting for completion of all preceding bus operations.

It is another technical advantage of the present inventions that not every snooping bus device is required to snoop and fully act upon a repeated bus operation.

It is a further technical advantage of the present inventions that deadlocks are less likely to occur.

It is yet another technical advantage of the present inventions that a master bus device retains flexibility by having the option of not repeating a bus operation.

BRIEF DESCRIPTION OF THE DRAWINGS

An illustrative embodiment of the present invention and its advantages are better understood by referring to the following descriptions and accompanying drawings, in which.

DETAILED DESCRIPTION

An illustrative embodiment of the present invention and its advantages are better understood by referring to FIGS.

1–3b of the drawings, like numerals being used for like and corresponding parts of the accompanying drawings.

Figure 1:
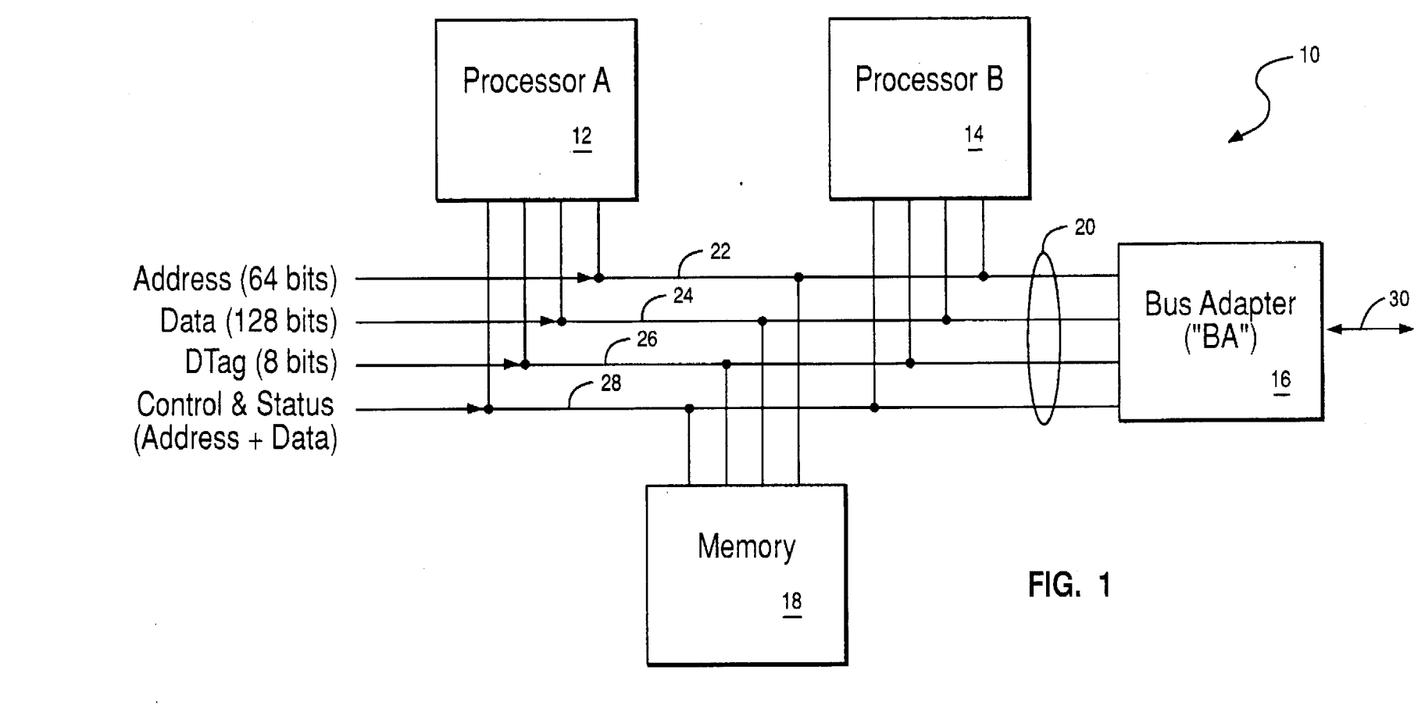
FIG. 1 is a block diagram of an information processing system according to an illustrative embodiment.

FIG. 1 is a block diagram of an information processing system, indicated generally at 10, according to an illustrative embodiment. Information processing system 10 includes multiple bus devices 12, 14, 16 and 18. More particularly, device 12 is a first processor device (hereinafter referenced as "Processor A"), and device 14 is a second processor device (hereinafter referenced as "Processor B"). Moreover, device 16 is a bus adapter device (hereinafter referenced as "BA"), and device 18 is a memory device. Processor A, Processor B, and BA 16 operate in accordance with the illustrative embodiment, as discussed further hereinbelow in connection with FIGS. 2a–b and 3a–b.

Devices 12, 14, 16 and 18 are connected to one another through a system bus 20. Accordingly, devices 12, 14, 16 and 18 communicate information to one another through system bus 20. In the illustrative embodiment of FIG. 1, system bus 20 includes a 64-bit address bus 22, a 128-bit data bus 24, an 8-bit data-tag ("DTag") bus 26, and an 10-bit control/status bus 28.

Further, BA 16 is connected to an additional bus 30. Accordingly, BA 16 operates as an interface between system bus 20 and bus 30. In this manner, devices 12, 14 and 18 communicate information through BA 16 and system bus 20 to one or more other devices (not shown) connected to bus 30.

With a ReRun technique according to the illustrative embodiment, system 10 supports "completion" of shared bus operations out of order (i.e. weakly ordered) relative to the order in which such operations are initiated on system bus 20. By outputting an operation signal, a bus device is able to initiate a bus operation on system bus 20 that is snooped by other bus devices. In response to the operation signal, each snooping bus device (i.e. each device that snoops the operation signal) initiates an action. For example, the action can be the reading status bits in the snooping device's cache memory. As another example, the action can be BA 16 determining a remote status through bus 30 from one or more other devices (not shown) connected to bus 30.

Moreover, through system bus 20, each snooping bus device outputs a snoop response indication to the master bus device (i.e. the device which initiated the bus operation) simultaneously some predetermined latency from initiation of the bus operation on system bus 20. The snoop response indication indicates whether the snooping bus device completed the action which was previously initiated by the snooping bus device in response to the operation signal. Notably, the absence of an output signal (i.e. a "Null" response indication) from a snooping device is itself considered a snoop response indication.

The ReRun technique is applicable regardless of whether system bus 20 is pipelined or fully interlocked with respect to the snoop response indication, or whether the snoop response indication is a fixed or variable latency from initiation of the bus operation. In the illustrative embodiment, snoop response indications occur in response to respective bus operations. Such snoop response indications occur in the same order as their respective bus operations, such that bus operations and snoop response indications are strongly ordered relative to one another.

Nevertheless, a response to a bus operation does not necessarily indicate "completion" of the bus operation. Accordingly, with the ReRun technique according to the illustrative embodiment, bus operations are able to "complete" out of order (i.e. weakly ordered) relative to the order in which such operations are initiated on system bus 20. Accordingly, in a significant aspect of the preferred embodiment, system 10 supports variations in the latency needed by a particular snooping device to complete the action which was previously initiated by the snooping bus device in response to the operation signal, according to the bus operation and the state of system 10.

According to the ReRun technique of the illustrative embodiment, one or more bus snooping devices can output a ReRun response indication for indicating to the master bus device that the master bus device needs to extend the snoop latency for an original bus operation. The ReRun response indication operates as a snoop response indication for the original bus operation and therefore allows other bus operations to continue, while also advantageously allowing each snooping device (that issued the ReRun response indication) to continue processing (i.e. acting in response to) the original bus operation. Each snooping device (that issued the ReRun response indication) stores an operation tag (previously output by the master bus device in connection with the original bus operation) for later identifying the particular bus operation.

At a later time after a ReRun response indication, the master bus device reoutputs the operation signal, thereby repeating the original bus operation; also, the master bus device reoutputs the same operation tag as before in connection with the original bus operation. Each snooping device (that issued the ReRun response indication) compares the output operation tag with any previously stored operation tag(s). If no match occurs between the operation tag and the previously stored operation tag, the snooping device ignores the repeated bus operation.

By comparison, in response to a match between the operation tag and a previously stored operation tag, the snooping device responds to the repeated bus operation. Despite an earlier ReRun response indication, if the snooping device still needs more time to completely process the repeated bus operation (i.e. complete the action which was previously initiated by the snooping bus device in response to the operation signal), the snooping device can again output another ReRun response indication for indicating to the master bus device that the master bus device needs to further extend the snoop latency for the repeated bus operation. Advantageously, any number of ReRun response indications can be issued in response to successively repeated bus operations, thereby operating as snoop response indications for the repeated bus operations and therefore allowing other bus operations to continue.

Figure 2A:
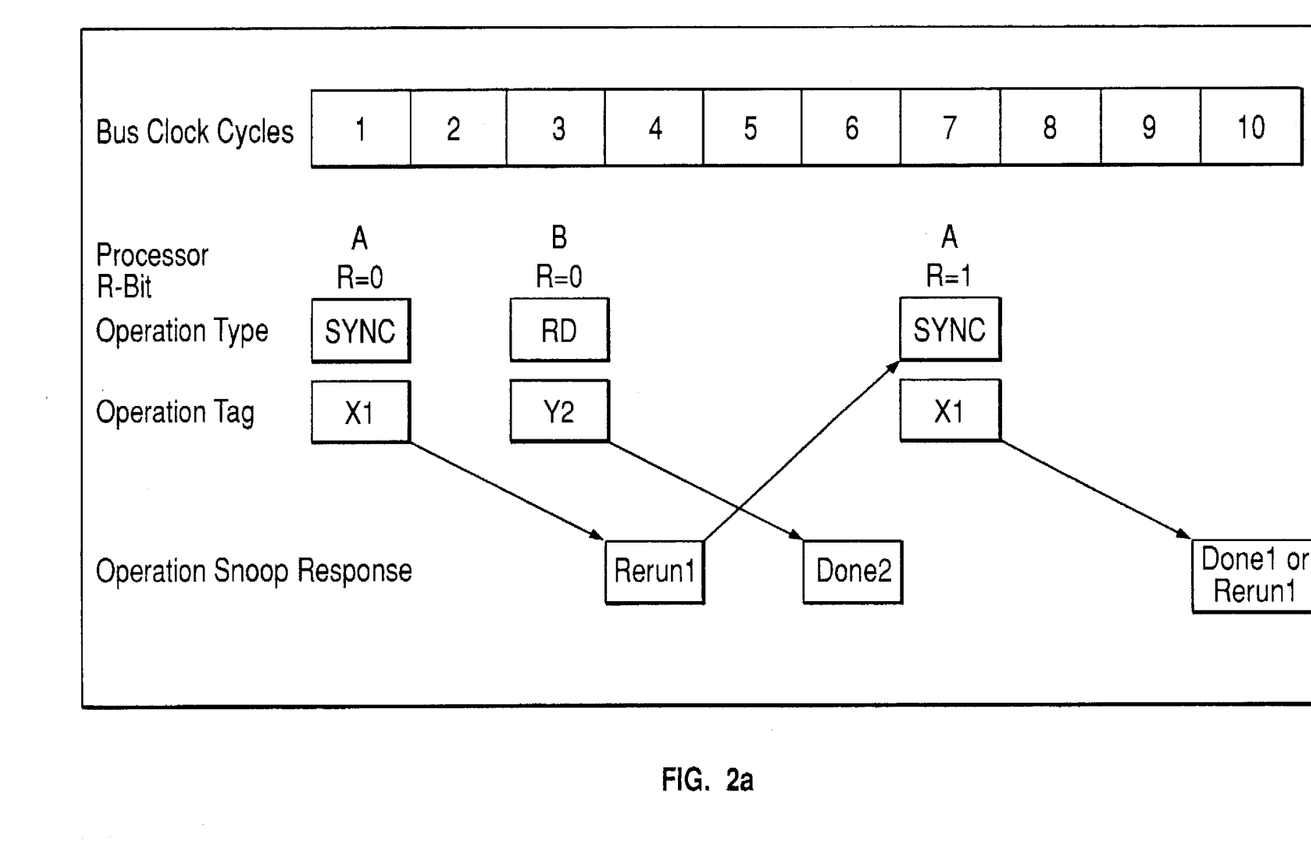
FIGS. 2a–b are illustrations of example operations performed by the information processing system through a system bus of FIG. 1.
Figure 2B:
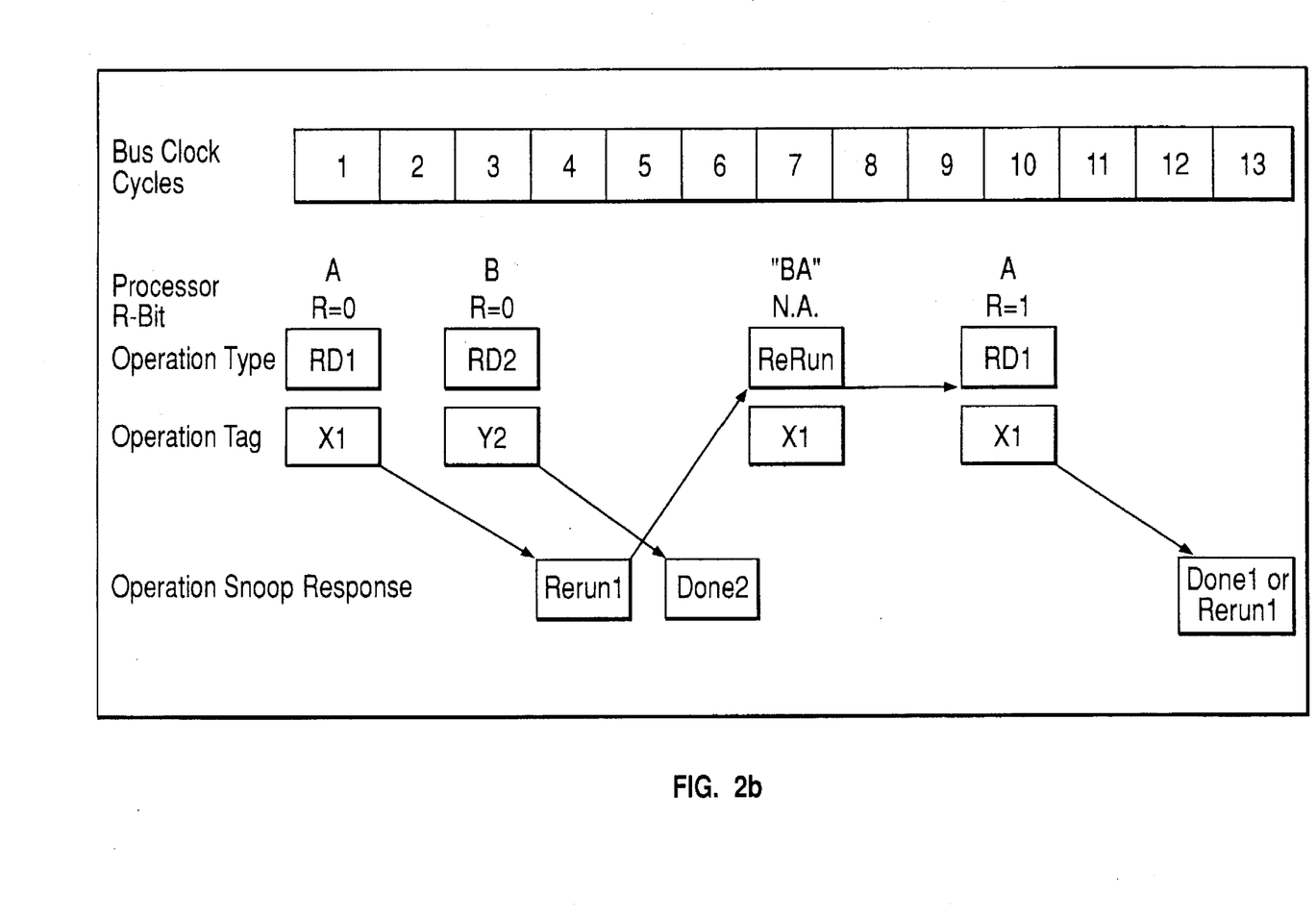

FIGS. 2a–b are illustrations of example operations performed by system 10 through system bus 20 of FIG. 1, according to the ReRun system bus technique of the illustrative embodiment. More particularly, FIG. 2a is an illustration of example SYNC/TLBSYNC operations performed by system 10, according to the ReRun system bus technique of the illustrative embodiment. The SYNC instruction operation and TLBSYNC instruction operation are discussed further hereinbelow in the Appendix. Processor and bus adapter bus devices are able to use the ReRun technique of the illustrative embodiment for extending the response of SYNC and TLBSYNC bus operations.

By comparison, FIG. 2b is an illustration of example non-SYNC/non-TLBSYNC operations performed by system 10, according to the ReRun system bus technique of the illustrative embodiment. In the illustrative embodiment, bus adapter bus devices (e.g. BA 16) are able to use the ReRun technique for extending the response of non-SYNC/non-TLBSYNC bus operations.

Referring to FIG. 2a, during a clock cycle 1 of system bus 20, Processor A outputs a synchronization ("SYNC") operation signal through system bus 20. In connection with the SYNC operation during clock cycle 1, Processor A outputs through system bus 20: an operation tag=X1, and an R-bit=0. Through address bus 22, Processor A outputs the operation tag and the R-bit. Through control/status bus 28, Processor A outputs the operation type (e.g. SYNC) and the transfer size (i.e. number of bytes to be transferred).

During a clock cycle 3 of system bus 20, Processor B outputs a read ("RD") operation signal through system bus 20. In connection with this RD operation during clock cycle 2, Processor B outputs through system bus 20: an operation tag=Y2, and an R-bit=0.

During a clock cycle 4 of system bus 20, Processor B outputs a ReRun1 operation signal through system bus 20, in response to the SYNC operation output from Processor A during clock cycle 1. By comparison, if no bus device had issued a "ReRun" operation signal or a "Retry" operation signal (in response to the SYNC operation output from Processor A during clock cycle 1) through system bus 20 at or before clock cycle 4 (i.e. within a fixed latency predetermined time of three bus clock cycles after the SYNC operation), then Processor A would have successfully "completed" the SYNC operation it initiated during clock cycle 1.

Accordingly, the ReRun technique of the illustrative embodiment supports variations (beyond the predetermined fixed latency response time) in the latency needed by a particular snooping device to complete the action which was previously initiated by the snooping bus device in response to the operation signal, according to the bus operation and the state of system 10. A bus device is able to extend the latency by issuing a "ReRun" operation. Nevertheless, the "ReRun" techniques of the illustrative embodiment are equally advantageous and applicable to alternative systems using a variable latency instead of a fixed latency.

During a clock cycle 6 of system bus 20, Processor B successfully "completes" the RD operation it initiated during clock cycle 3, as indicated in FIG. 2a by the label "Done2". Processor B successfully completes the RD operation in response to other bus devices failing to output (within a fixed latency of three bus clock cycles after the RD operation) either (1) a "Retry" operation or (2) a "ReRun" operation.

In response to the expiration of a predetermined number of cycles (i.e., in the illustrative embodiment, 2 cycles) after the ReRun1 operation (of cycle 4), Processor A reoutputs the SYNC operation signal through system bus 20 during a clock cycle 7 of system bus 20. Like the SYNC operation of clock cycle 1, Processor A outputs through system bus 20 the operation tag=X1 in connection with the SYNC operation during clock cycle 7. Nevertheless, unlike the SYNC operation of clock cycle 1, Processor A outputs through system bus 20 an R-bit=1 in connection with the SYNC operation during clock cycle 7. By asserting the R-Bit=1, Processor A indicates to other bus devices that Processor A had earlier output the SYNC operation.

During a clock cycle 10 of system bus 20, either:

Processor A successfully completes the SYNC operation it initiated during clock cycle 7, as indicated in FIG. 2a by the label "Done1"; or Processor B outputs another ReRun1 operation signal through system bus 20 in response to the SYNC operation output from Processor A during clock cycle 7, as indicated by the label "ReRun1".

Referring to FIG. 2b, during a clock cycle 1 of system bus 20, Processor A outputs a read ("RD1") operation signal through system bus 20. In connection with the RD1 operation during clock cycle 1, Processor A outputs through system bus 20: an operation tag=X1, and an R-bit=0.

During a clock cycle 3 of system bus 20, Processor B outputs a read ("RD2") operation signal through system bus 20. In connection with this RD2 operation during clock cycle 3, Processor B outputs through system bus 20: an operation tag=Y2, and an R-bit=0.

During a clock cycle 4 of system bus 20, BA 16 outputs a ReRun1 operation signal through system bus 20, in response to the RD1 operation output from Processor A during clock cycle 1.

During a clock cycle 6 of system bus 20, Processor B successfully completes the RD2 operation it initiated during clock cycle 3, as indicated by the label "Done2".

During a clock cycle 7 of system bus 20, BA 16 outputs a tag-matching ReRun operation signal through system bus 20, in response to BA 16 being able to (or predicting it will be able to, within a predetermined number of clock cycles) respond to the RD1 operation (output from Processor A during clock cycle 1). In the illustrative embodiment, BA 16 is able to respond to the RD1 operation after receiving a remote status through bus 30 from one or more other devices (not shown) connected to bus 30. Nevertheless, BA 16 is able to output the tag-matching ReRun operation before receiving the remote status, for the purpose of reducing the latency of responding to the RD1 operation on system bus 20.

In connection with this tag-matching ReRun operation during clock cycle 7, BA 16 outputs the operation tag=X1 through system bus 20. The R-bit is not applicable to the tag-matching ReRun operation. The tag-matching ReRun bus operation is an address-only operation on address bus 22. The tag-matching ReRun bus operation has no address and therefore is tag-only.

If an additional bus adapter (not shown) is connected to system bus 20, then each bus adapter snoops for another bus adaptor to output a tag-matching ReRun operation signal. For example, if the additional bus adapter detects a tag-matching ReRun operation signal output by BA 16, and if the tag-matching ReRun operation's tag matches the tag of an operation previously ReRun by the additional bus adapter, then the additional bus adapter does not output another tag-matching ReRun operation signal.

During a clock cycle 10 of system bus 20, Processor A outputs the RD1 operation signal through system bus 20, in response to the tag-matching ReRun operation signal output from BA 16 during clock cycle 7. Like the RD1 operation of clock cycle 1, Processor A outputs through system bus 20 the operation tag=X1 in connection with the RD1 operation during clock cycle 10. Nevertheless, unlike the RD1 operation of clock cycle 1, Processor A outputs through system bus 20 an R-bit=1 in connection with the RD1 operation during clock cycle 10.

During a clock cycle 13 of system bus 20, either:

Processor A successfully completes the RD1 operation it initiated during clock cycle 10, as indicated in FIG. 2b by the label "Done1" at clock cycle 13; or BA 16 outputs another ReRun1 operation signal through system bus 20 in response to the RD1 operation output from Processor A during clock cycle 10, as indicated in FIG. 2b by the label "ReRun1" at clock cycle 13.

For example, during clock cycle 13, BA 16 might output another ReRun1 operation signal through system bus 20 (in response to the RD1 operation output from Processor A during clock cycle 10) if BA 16 had mispredicted (during clock cycle 7) its ability to respond to the RD1 operation within the predetermined number of clock cycles (i.e. in the illustrative embodiment, 6 clock cycles).

Accordingly, system 10 of the illustrative embodiment achieves performance advantages by supporting weakly ordered "completion" of shared bus operations relative to the order in which such operations are initiated on system bus 20. Such advantages include the enhanced performance achieved when a long snoop latency bus operation does not impact completion of subsequent shorter snoop latency bus operations.

Moreover, performance is improved, because a repeated bus operation (repeated in response to an earlier ReRun response indication) is snooped and reexecuted (i.e. fully acted upon) only by each snooping device that issued (or that would have issued, absent another device already issuing) the earlier ReRun response indication. This is advantageous relative to previous techniques, such as "Retry" techniques, in which every snooping device snoops and reexecutes (as for example by reading status bits in the snooping device's cache memory) a repeated bus operation.

Advantageously, in the illustrative embodiment, a snooping bus device can output either a "Retry" response indication or a "ReRun" response indication on system bus 20 to allow subsequent bus operations to continue. For such a purpose, the snooping bus device outputs the "Retry" response indication if future operations of the snooping bus device are independent of whether the master bus device later repeats the "Retried" bus operation; in such a situation, the master bus device optionally repeats the "Retried" bus operation. By comparison, the snooping bus device outputs the "ReRun" response indication if future operations of the snooping bus device are dependent on the master bus device later repeating the "ReRun" bus operation; in such a situation, the master bus device always repeats the "ReRun" bus operation Accordingly, after outputting the "ReRun" response indication, the snooping bus device is able to continue processing the original bus operation, without concern that the master bus device might not later repeat the "ReRun" bus operation.

Function is streamlined, because the ReRun technique of the illustrative embodiment avoids deadlocks that could be introduced when only a "Retry" technique is used. For example, such a deadlock could occur if future operations of the snooping bus device are dependent on the master bus device later repeating the "Retried" bus operation, yet for some reason the master bus device fails to repeat the "Retried" bus operation. Alternatively, if the master bus device were required to always repeat the "Retried" bus operation, the master bus device would lose valuable flexibility by failing to have the option of not repeating the "Retried" bus operation.

In the illustrative embodiment, a snooping bus device is able to output either a "Retry" response indication or a "ReRun" response indication on system bus 20 to allow subsequent bus operations to continue. Accordingly, in the illustrative embodiment, the snooping bus device outputs a "Retry" operation in situations where future operations of the snooping bus device are independent of whether the master bus device later repeats the "Retried" bus operation; in this manner, the master bus device retains valuable flexibility by having the option of not repeating the "Retried" bus operation. Moreover, the snooping bus device outputs a "ReRun" operation in situations where future operations of the snooping bus device are dependent on the master bus device later repeating the "ReRun" bus operation; in this manner, the snooping device is able to rely upon the master bus device to always repeat the "ReRun" bus operation, thereby avoiding possible deadlocks.

Advantageously, in the illustrative embodiment, even if the snooping bus device outputs a "ReRun" operation, the master bus device retains valuable flexibility by having the option of aborting the "ReRun" bus operation. If the master bus device elects to abort the "ReRun" bus operation, the master bus device repeats the "ReRun" bus operation (such that the R-bit=1) and then outputs a "Retry" response indication on system bus 20. This "Retry" response indication (output by the master bus device immediately after the master bus device repeats the "ReRun" bus operation) operates as an indication to the snooping bus device that the master bus device is aborting the "ReRun" bus operation. In this manner, the snooping bus device avoids a possible deadlock by ceasing reliance upon the master bus device's repetition of the "ReRun" bus operation.

Figure 3A:
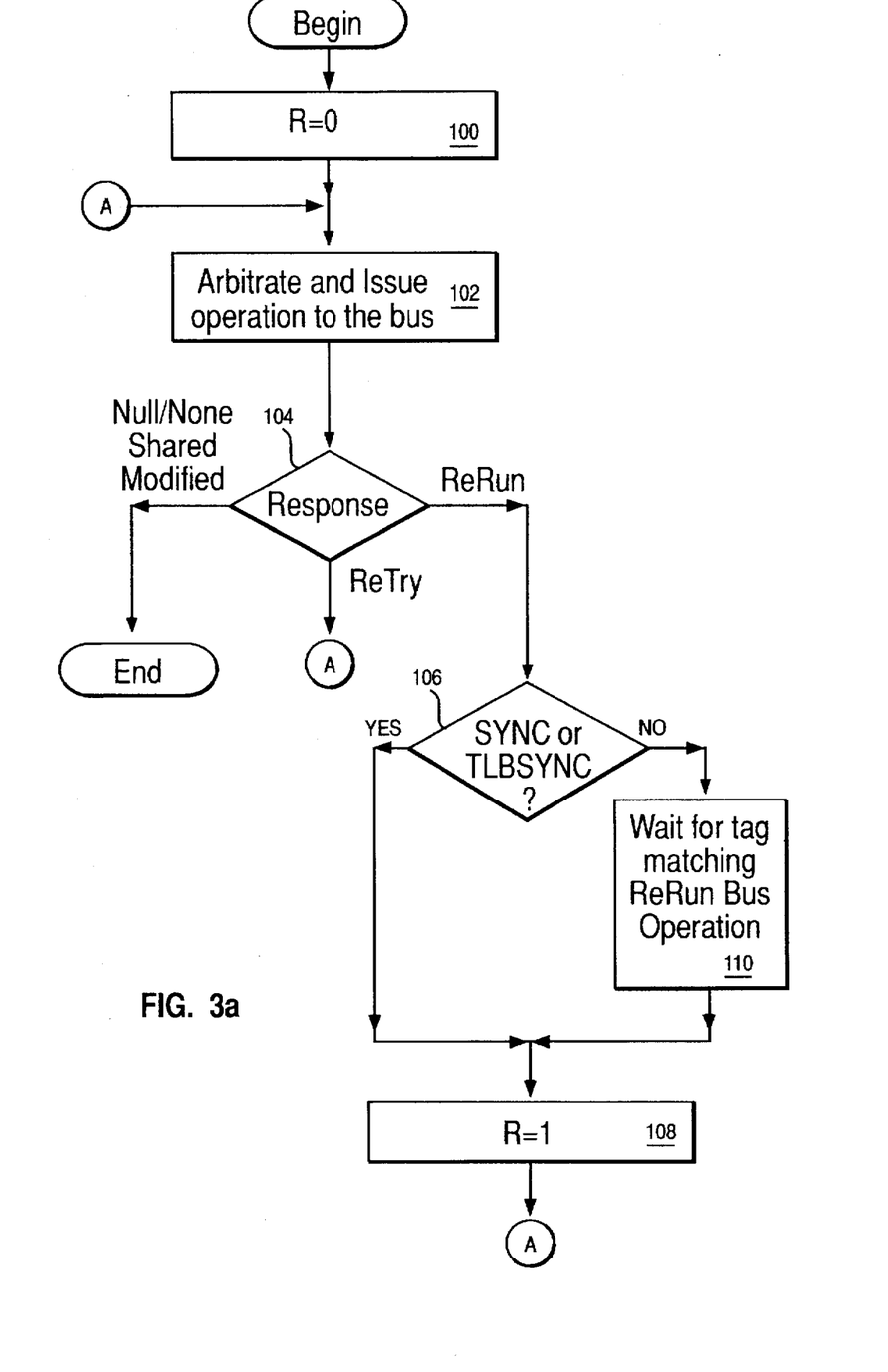
FIGS. 3a–b are flow charts of operations performed by the information processing system of FIG. 1.
Figure 3B:
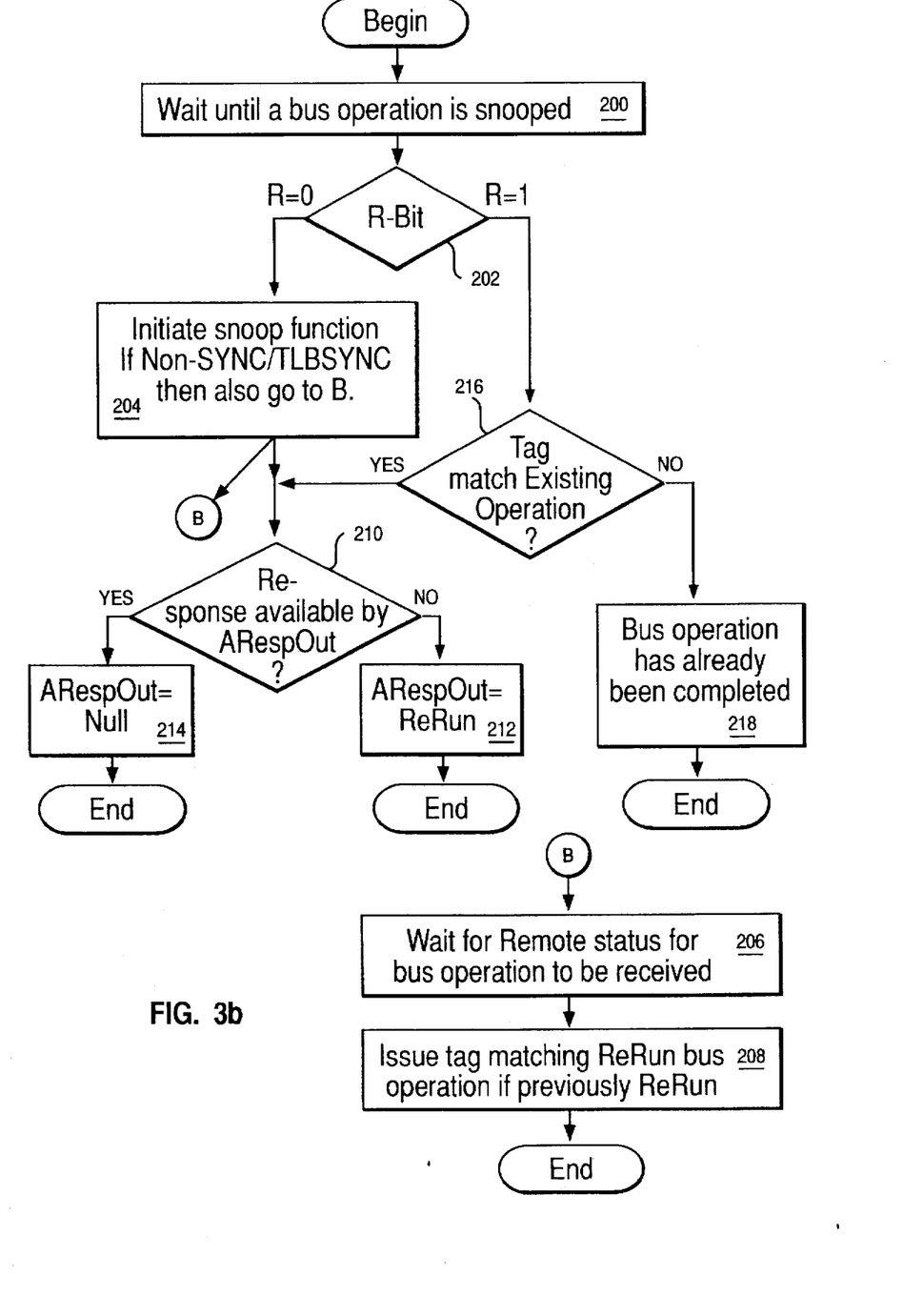

FIGS. 3a–b are flow charts of operations performed by information processing system 10. More particularly, FIG. 3a is a flow chart of operations performed by a master bus device ("MBD") of system 10 (e.g. Processor A in the examples of FIGS. 2a–b). By comparison, FIG. 3b is a flow chart of operations performed by a snooping processor (e.g. Processor B in the example of FIG. 2a) and bus adaptor (e.g. BA 16 in the example of FIG. 2b), hereinafter collectively referenced as snooping bus devices ("SBD's").

Referring to FIG. 3a, execution begins at a step 100 where the MBD clears the R-bit (i.e. R-bit=0). At a next step 102, the MBD arbitrates for control of system bus 20 and outputs a bus operation signal through system bus 20. After step 102, execution continues to a decision block 104.

At decision block 104, if the MBD receives a Null/None, Shared, or Modified response indication through system bus 20 in response to the bus operation of step 102, then execution ends as shown in FIG. 3a. By comparison, if the MBD receives a Retry response indication through system bus 20 in response to the bus operation of step 102, then execution returns to step 102. Alternatively, if the MBD receives a ReRun response indication through system bus 20 in response to the bus operation of step 102, then execution continues to a decision block 106.

At decision block 106, if the bus operation of step 102 is a SYNC operation or TLBSYNC operation, then execution continues to a step 108. By comparison, if the bus operation of step 102 is neither a SYNC operation nor a TLBSYNC operation, then execution continues to a step 110 where the MBD waits for a tag-matching ReRun operation, as discussed further hereinabove in connection with clock cycle 7 of FIG. 2b.

After step 110, execution continues to step 108. At step 108, the MBD sets the R-bit (i.e. R-bit=1). After step 108, execution returns to step 102.

Referring to FIG. 3b, execution begins at a step 200 where the SBD waits for a bus operation on system bus 20. After the SBD snoops a bus operation at step 200, execution continues to a decision block 202 where the SBD determines whether the R-bit is 0 or 1. If the SBD determines at decision block 202 that the R-bit=0, then execution continues to a step 204 where the SBD initiates the function requested by the snooped bus operation. Moreover, at step 204, if the bus operation is a non-SYNC/non-TLBSYNC operation, then execution continues to a step 206.

At step 206, the SBD waits to receive a remote status for a bus operation on bus 30. After the SBD receives the remote status, execution continues to a step 208. At step 208, the SBD outputs a tag-matching ReRun operation on system bus 20 (as discussed further hereinabove in connection with clock cycle 7 of FIG. 2b), only if the original snooped bus operation (snooped at step 200) previously resulted in a ReRun operation (as discussed further hereinbelow in connection with step 212 and hereinabove for example in connection with clock cycle 4 of FIG. 2b). After step 208, execution ends as shown in FIG. 3b.

After step 204, execution continues to a decision block 210. Notably, at step 204, if the bus operation is a non-SYNC/non-TLBSYNC operation, then execution continues to step 206 in parallel with continuing to decision block 210. At decision block 210, the SBD determines whether it is able to respond to the original snooped bus operation (snooped at step 200) at or before "ARespOut".

"ARespOut" is a predetermined latency (e.g. number of clock cycles) after the bus operation is snooped at step 200. The latency is discussed further hereinabove in connection with FIGS. 2a–b. If the SBD determines at decision block 210 that it is unable to respond to the original snooped bus operation at or before "ARespOut", then execution continues to a step 212. At step 212, the SBD outputs a ReRun operation, as discussed further hereinabove for example in connection with clock cycle 4 of FIG. 2b. After step 212, execution ends as shown in FIG. 3b.

By comparison, if the SBD determines at decision block 210 that it is able to respond to the original snooped bus operation at or before "ARespOut", then execution continues to a step 214. At step 214, the SBD outputs a "Null" response indication. After step 214, execution ends as shown in FIG. 3b.

Referring again to decision block 202, if the SBD determines that the R-bit=1, then execution continues to a decision block 216. At decision block 216, the SBD determines whether the snooped bus operation has an operation tag equal to that of a previously snooped (yet uncompleted) bus operation which previously resulted in a ReRun operation by the SBD (as discussed further hereinbelow in connection with step 212 and hereinabove for example in connection with clock cycle 4 of FIG. 2b). If the SBD determines at decision block 216 that the operation tag is equal, then execution continues to decision block 210 and, if the bus operation is a non-SYNC/non-TLBSYNC operation, then execution also continues to step 206 in parallel with continuing to decision block 210.

By comparison, if the SBD determines at decision block 216 that the operation tag is not equal, then execution continues to a step 218. At step 218, the SBD records completion of the snooped bus operation. After step 218, execution ends as shown in FIG. 3b.

The following table summarizes the manner in which snooping devices ("snoopers") respond to bus operations. More particularly, the following table summarizes the manner in which bus adapters (e.g. BA 16) respond to non-SYNC/non-TLBSYNC bus operations and the manner in which processors (e.g. Processor A and Processor B) and bus adapters respond to SYNC and TLBSYNC bus operations.

| R-Bit | Address Tag Match | Response by: Bus Adapters and Processors for SYNC/TLBSYNC; Bus Adapters for Non-SYNC/TLBSYNC. |
|---|---|---|
| 0 | No | The snooper accepts the bus operation as a new bus operation to process. |
| 0 | Yes | ILLEGAL CASE: The snooper should not encounter a condition where an R=0 bus operation tag matches. |
| 1 | No | The snooper has already finished the bus operation and ignores this and all future occurrences of the bus operation. |
| 1 | Yes | The snooper uses the response of this bus operation to indicate ReRun or not ReRun. |

Although an illustrative embodiment of the present invention and its advantages have been described in detail hereinabove, they have been described as example and not as limitation. Various changes, substitutions and alterations can be made in the illustrative embodiment without departing from the breadth, scope and spirit of the present invention. The breadth, scope and spirit of the present invention should not be limited by the illustrative embodiment, but should be defined only in accordance with the following claims and equivalents thereof.

APPENDIX: TLBSYNC AND SYNC INSTRUCTIONS

Execution of a TLBSYNC instruction ensures that all LOAD instructions and STORE instructions in all processors, that may have used a translation lookaside buffer ("TLB") entry that has been invalidated in response to a TLBIE (i.e. TLB invalidate entry) instruction, have been performed. In the illustrative embodiment, the TLBSYNC instruction is only issued by one process at a time, and this is software controlled.

Each of Processors A and B is able to operate as a TLBSYNC master processor or snooping processor. Execution of the TLBSYNC instruction does not ensure that all previous TLBIE instructions have been issued to system bus 20. Moreover, if a previous TLBIE instruction has completed on system bus 20, execution of the TLBSYNC instruction does not ensure that such previous TLBIE instruction is completed by a snooping processor. Accordingly, in the illustrative embodiment, software precedes a TLBSYNC instruction with a SYNC instruction in order to ensure that all TLBIE instructions executed prior to the TLBSYNC instruction will have been completed on system bus 20 and completed by all processors before the TLBSYNC instruction is issued to system bus 20. Completion of the TLBSYNC bus operation ensures that all instructions on other processors that may have used a translation invalidated by a TLBIE instruction are completed.

In response to a TLBSYNC instruction, a snooping processor ensures that all loads, stores, and instruction fetches that used any TLB entries have been either flushed or performed. A snooped TLBSYNC instruction will have the same effect on a snooping processor that a SYNC instruction would have if executed by the snooping processor. A snooping processor can issue "ReRun" on system bus 20 as many times as necessary to complete the TLBSYNC instruction.

When a portion of storage is to be forced to a known state, in the illustrative embodiment, storage is synchronized with respect to all processors. The SYNC instruction provides an ordering function for the effects of all instructions executed by a given processor. This is achieved by explicitly indicating in the instruction stream that synchronization is requested, by inserting a SYNC instruction. By executing a SYNC instruction, a processor ensures that all instructions previously initiated by the processor appear to have completed before the SYNC instruction is completed, and that no subsequent instructions are initiated by the processor until after the SYNC instruction is completed. When the SYNC instruction is completed, the effects of all storage accesses initiated by the processor before the SYNC instruction will have been performed, with respect to all other processors and mechanisms that access storage, before its next instruction is executed.

A processor can use the SYNC instruction to ensure that all updates to a shared data structure are visible to all other processors prior to executing a store that will release the lock on that data structure. By executing the SYNC instruction a processor ensures that TLBIE instructions executed by the processor have been completed by that processor. However, execution of the SYNC instruction does not wait for TLBIE instructions to be completed by other processors. Accordingly, in the illustrative embodiment, the processor executes a TLBSYNC instruction followed by a SYNC instruction to ensure that all previous TLBIE instructions have been completed by all processors.

The SYNC instruction operates as a barrier for all subsequent instructions, and it waits for completion of all unperformed snoop pushes in all other processors. More particularly, the processor holds the SYNC instruction in the dispatch stage until the processor finishes execution of (and "completes") all previous instructions. After the processor completes all previous instructions, the SYNC bus operation is issued to system bus 20. The processor does not dispatch subsequent instructions until the SYNC bus operation is completed.

If the processor receives a "Retry" signal on system bus 20 in response to the SYNC bus operation, the processor reissues the SYNC bus operation with R=1. If the processor receives a "Null" signal on system bus 20 in response to the SYNC bus operation, the processor completes the SYNC bus operation. In response to the SYNC bus operation, the processor will receive one or more "ReRun" signals on system bus 20 unless and until all previous snooped bus operations and all snoop pushes caused by previous snooped bus operations have been completed on system bus 20, at which time the processor will receive a "Null" signal on system bus 20 in response to the SYNC bus operation. In response to the SYNC instruction, the processor does not dispatch subsequent instructions until the processor completes all store buffer entries due to snooped bus operations. Memory devices may ignore the SYNC bus operation if reordering cannot occur and if access to the memory array is only from system bus 20.

What is claimed is:

1. A method of communicating between devices, comprising the steps of:
   outputting a signal from a first device;
   in response to said signal, initiating at least one action by a second device; and
   outputting an indication from said second device to said first device of whether said second device completed said action and of whether future operation of said second device is independent of said first device reoutputting said signal, wherein said indication is of a first type if said second device completed said action, of a second device if said second device failed to complete said action and future operation of said second device is dependent upon said first device reoutputting said signal, and of a third type if said second device failed to complete said action and future operation of said second device is independent of said first device reoutputting said signal.

2. The method of claim 1 and further comprising the step of reoutputting said signal from said first device in response to said indication indicating said second device failed to complete said action and operation of said second device is dependent upon said first device reoutputting said signal.

3. The method of claim 2 and further comprising the step of outputting, in response to said reoutput signal, an additional indication of whether said second device completed said action.

4. The method of claim 2 and further comprising the step of outputting an additional signal from said second device, wherein said reoutputting step comprises the step of reoutputting said signal from said first device in response to said additional signal.

5. The method of claim 4 wherein said step of outputting said additional signal comprises the step of outputting said additional signal in response to said second device completing said action.

6. The method of claim 4 wherein said step of outputting said additional signal comprises the step of outputting said additional signal in response to said second device predicting completion of said action.

7. The method of claim 6 and further comprising the step of outputting, in response to said reoutput signal, an additional indication of whether said second device completed said action.

8. The method of claim 7 wherein said step of outputting said additional indication comprises the step of outputting said additional indication indicating that said second device failed to complete said action, such that said second device mispredicted completion of said action.

9. The method of claim 1 wherein said second type of indication indicates that said second device failed to complete said action and operation of said second device is dependent upon said first device reoutputting said signal in order to avoid a possible deadlock.

10. The method of claim 9 wherein said second type of indication is a rerun indication.

11. The method of claim 10 wherein said third type of indication is a retry indication.

12. The method of claim 11 wherein said first type of indication is a null indication.

13. A method of communicating between devices, comprising the steps of:
   outputting a signal from a first device;
   in response to second and third devices accepting said signal, initiating at least one action by said second and third devices;
   within a predetermined latency after said second and third devices accept said signal, outputting a snoop response indication for indicating whether said second and third devices completed said action; and
   without reinitiating said action by said third device, reoutputting said signal from said first device in response to said indication indicating that said second device failed to complete said action and that said third device completed said action.

14. The method of claim 13 and further comprising the step of outputting, in response to said reoutput signal, an additional indication of whether said second device completed said action.

15. The method of claim 13 and further comprising the step of outputting an additional signal from said second device, wherein said reoutputting step comprises the step of reoutputting said signal from said first device in response to said additional signal.

16. The method of claim 15 wherein said step of outputting said additional signal comprises the step of outputting said additional signal in response to said second device completing said action.

17. The method of claim 15 wherein said step of outputting said additional signal comprises the step of outputting said additional signal in response to said second device predicting completion of said action.

18. The method of claim 17 and further comprising the step of outputting, in response to said reoutput signal, an additional indication of whether said second device completed said action.

19. The method of claim 18 wherein said step of outputting said additional indication comprises the step of outputting said additional indication indicating that said second device failed to complete said action, such that said second device mispredicted completion of said action.

20. The method of claim 13 wherein said step of outputting said indication comprises the steps of:
outputting a rerun indication from said second device indicating that said second device failed to complete said action; and
outputting a null indication from said third device indicating that said third device completed said action.

21. The method of claim 13 wherein said step of outputting said indication comprises the step of outputting said indication a predetermined time after initiating said action.

22. A system for communicating between devices, comprising:
a first device for outputting a signal; and
a second device coupled to said first device for initiating at least one action in response to said signal and for outputting an indication to said first device of whether said second device completed said action and of whether future operation of said second device is independent of said first device reoutputting said signal, wherein said indication is of a first type if said second device completed said action, of a second type if said second device failed to complete said action and future operation of said second device is dependent upon said first device reoutputting said signal, and of a third type if said second device failed to complete said action and future operation of said second device is independent of said first device reoutputting said signal.

23. The system of claim 22 wherein said first device reoutputs said signal in response to said indication indicating said second device failed to complete said action and operation of said second device is dependent upon said first device reoutputting said signal.

24. The system of claim 23 wherein said second device outputs, in response to said reoutput signal, an additional indication of whether said second device completed said action.

25. The system of claim 23 wherein said second device outputs an additional signal, and wherein said first device reoutputs said signal in response to said additional signal.

26. The system of claim 25 wherein said second device outputs said additional signal in response to said second device completing said action.

27. The system of claim 25 wherein said second device outputs said additional signal in response to said second device predicting completion of said action.

28. The system of claim 27 wherein said second device outputs, in response to said reoutput signal, an additional indication of whether said second device completed said action.

29. The system of claim 28 wherein said second device outputs said additional indication indicating that said second device failed to complete said action, such that said second device mispredicted completion of said action.

30. The system of claim 22 wherein said second type of indication indicates that said second device failed to complete said action and operation of said second device is dependent upon said first device reoutputting said signal in order to avoid a possible deadlock.

31. The system of claim 30 wherein said second type of indication is a rerun indication.

32. The system of claim 31 wherein said third type of indication is a retry indication.

33. The system of claim 32 wherein said first type of indication is a null indication.

34. A system for communicating between devices, comprising:
a first device for outputting a signal; and
second and third devices coupled to said first device for initiating at least one action in response to said second and third devices accepting said signal and for outputting, within a predetermined latency after said second and third devices accept said signal, a snoop response indication for indicating whether said second and third devices completed said action, wherein said first device, without reinitiating said action by said third device, reoutputs said signal in response to said indication indicating that said second device failed to complete said action and that said third device completed said action.

35. The system of claim 34 wherein said second device outputs, in response to said reoutput signal, an additional indication of whether said second device completed said action.

36. The system of claim 34 wherein said second device outputs an additional signal, and wherein said first device reoutputs said signal in response to said additional signal.

37. The system of claim 36 wherein said second device outputs said additional signal in response to said second device completing said action.

38. The system of claim 36 wherein said second device outputs said additional signal in response to said second device predicting completion of said action.

39. The system of claim 38 wherein said second device outputs, in response to said reoutput signal, an additional indication of whether said second device completed said action.

40. The system of claim 39 wherein said second device outputs said additional indication indicating that said second device failed to complete said action, such that said second device mispredicted completion of said action.

41. The system of claim 34 wherein said indication comprises:
a rerun indication from said second device indicating that said second device failed to complete said action; and
a null indication from said third device indicating that said third device completed said action.

42. The system of claim 34 wherein said second and third devices output said indication a predetermined time after initiating said action.

* * * * *